US012675901B2

(12) United States Patent
Ramesh et al.

(10) Patent No.: US 12,675,901 B2
(45) Date of Patent: Jul. 7, 2026

(54) POSE-BASED IDENTIFICATION OF WEAKNESS

(71) Applicant: The Regents of the University of California, Oakland, CA (US)

(72) Inventors: Vishwajith Ramesh, San Diego, CA (US); Nadir Weibel, San Diego, CA (US); Gert Cauwenberghs, San Diego, CA (US); Kunal Agrawal, San Diego, CA (US); Brett C. Meyer, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 392 days.

(21) Appl. No.: 18/547,478

(22) PCT Filed: Feb. 25, 2022

(86) PCT No.: PCT/US2022/017944
§ 371 (c)(1),
(2) Date: Aug. 22, 2023

(87) PCT Pub. No.: WO2022/183017
PCT Pub. Date: Sep. 1, 2022

(65) Prior Publication Data
US 2024/0185453 A1 Jun. 6, 2024

Related U.S. Application Data

(60) Provisional application No. 63/153,902, filed on Feb. 25, 2021.

(51) Int. Cl.
*G06K 9/00* (2022.01)
*G06T 7/73* (2017.01)
(Continued)

(52) U.S. Cl.
CPC ................ *G06T 7/73* (2017.01); *G06V 10/44* (2022.01); *G06V 20/44* (2022.01); *G06T 2207/20044* (2013.01)

(58) Field of Classification Search
CPC . G06T 7/73; G06T 2207/20044; G06V 10/44; G06V 20/44; G06V 10/70;
(Continued)

(56) References Cited

U.S. PATENT DOCUMENTS

2016/0071284 A1 3/2016 Kontschieder et al.
2017/0177930 A1 6/2017 Holohan
(Continued)

OTHER PUBLICATIONS

American Stroke Association. Hemiparesis, 2019. (Available at https://www.stroke.org/en/about-stroke/effects-of-stroke/physical-effects-of-impact/hemiparesis), 4 pages.
(Continued)

*Primary Examiner* — Gregory A Morse
*Assistant Examiner* — Owais I Memon
(74) *Attorney, Agent, or Firm* — FisherBroyles, LLP

(57) ABSTRACT

A method, a system, and a computer program product for detecting and/or determining presence and/or absence of a weakness in one or more bodily joints of a subject. One or more video recordings of one or more subjects are received. One or more features from each of the video recordings are extracted. The features correspond to one or more bodily joints of the subjects. One or more models are trained based on the extracted features to identify a weakness in the bodily joints. The trained model is applied to a first video recording of a first subject, and, using the applied model, a determination is made whether a weakness is present in one or more bodily joints of the first subject.

19 Claims, 8 Drawing Sheets

(51) Int. Cl.
　　G06V 10/44　　　　(2022.01)
　　G06V 20/40　　　　(2022.01)
(58) Field of Classification Search
　　CPC ..... G06V 40/25; A61B 5/1128; A61B 5/7267;
　　　　　　A61B 5/7275; A61B 5/1118; A61B 5/165;
　　　　　　G16H 50/20; G16H 50/30; G16H 50/70;
　　　　　　　　　　　　　　　　　　　G16H 20/30
　　See application file for complete search history.

(56) References Cited

U.S. PATENT DOCUMENTS

| | | |
|---|---|---|
| 2019/0066832 A1 | 2/2019 | Kang et al. |
| 2021/0057112 A1* | 2/2021 | Mansi ................. G06F 16/9017 |
| 2021/0093231 A1* | 4/2021 | Uribe ....................... A61B 5/11 |
| 2022/0245812 A1* | 8/2022 | Newman-Toker ..... A61B 3/113 |

OTHER PUBLICATIONS

Center for Disease Control and Prevention, Stroke Facts. (Available at https://www.cdc.gov/stroke/facts.htm).

National Institute of Neurological Disorders and Stroke. NIH Stroke Scale, 2016. (Available at https://catalog.ninds.nih.gov/pubstatic//NDS-636/NDS-636.pdf.).

Stroke Association. Physical effects of stroke. (Available at https://www.stroke.org.uk/sites/default/files/publications/physical_effects_of_stroke_0.pdf.), 4 pages.

Tehrani, A. et al., "Diagnostic Errors More Common, Costly and Harmful Than Treatment Mistakes." John Hopkins Medicine, 2013 (Available at https://www.hopkinsmedicine.org/news/media/releases/diagnostic_errors_more_common_costly_and_harmful_than_treatment_mistakes#:~:text=In%20reviewing%2025%20years%20of,highest%20total%20of%20penalty%20payouts).

Weiss, T. C. "Hemiparesis—Types, Treatment, Facts and Information," 2017. (Available at www.disabled-world.com/health/neurology/hemiparesis.php).

Agrawal, K. et al., "Accuracy of Stroke Diagnosis in Telestroke-Guided Tissue Plasminogen Activator Patients." Journal of Stroke and Cerebrovascular Diseases, 25(12):2942-2946, 2016.

Arch, A. E. et al., "Missed Ischemic Stroke Diagnosis in the Emergency Department by Emergency Medicine and Neurology Services." Stroke, 47(3):668-673, 2016.

Berekashvili, K. et al., "Emergency Medicine Physicians Accurately Select Acute Stroke Patients for Tissue-Type Plasminogen Activator Treatment Using A Checklist." Stroke, 51(2):663-665, 2020.

Brott, T. et al., "Measurements of Acute Cerebral Infarction: A Clinical Examination Scale." Stroke, 20(7):864-870, Jul. 1989.

Buitinck, L. et al., "API Design for Machine Learning Software: Experiences from the Scikit-Learn Project." In ECML PKDD Workshop: Languages for Data Mining and Machine Learning, 15 pages, 2013.

Demaerschalk, B. M. et al., "Reliability of Real-Time Video Smartphone for Assessing National Institutes of Health Stroke Scale Scores in Acute Stroke Patients." Stroke, 43(12):3271-3277, 2012.

Fleiss, J. L. "Measuring Nominal Scale Agreement among Many Raters." Psychological bulletin, 76(5):378-382, 1971.

Genthon, N. et al., "Biomechanical Assessment of the Sitting Posture Maintenance in Patients with Stroke." Clinical biomechanics, 22(9):1024-1029, 2007.

Goyal, N. et al., "Cost Burden of Stroke Mimics and Transient Ischemic Attack after Intravenous Tissue Plasminogen Activator Treatment." Journal of Stroke and Cerebrovascular Diseases, 24(4):828-833, 2015.

Hussein, M. E. et al., "Human Action Recognition Using a Temporal Hierarchy of Covariance Descriptors on 3D Joint Locations." In Twenty-Third International Joint Conference on Artificial Intelligence, pp. 2466-2472, 2013.

Jackson, G. et al., "National Hospital Care Survey Demonstration Projects: Stroke Inpatient Hospitalizations." National Health Statistics Reports, No. 132, Nov. 13, 2019.

Jia, J. et al., "Accuracy of Emergency Medical Services Dispatcher and Crew Diagnosis of Stroke in Clinical Practice." Frontiers in neurology, 8:466, 2017.

Kachalia, A. et al., "Missed and Delayed Diagnoses in the Emergency Department: A Study of Closed Malpractice Claims from 4 Liability Insurers." Annals of emergency medicine, 49(2):196-205, 2007.

Kerber, K. A. et al., "Stroke among Patients with Dizziness, Vertigo, and Imbalance in the Emergency Department: A Population-Based Study." Stroke, 37(10):2484-2487, 2006.

Madsen, T. E. et al., "Potentially Missed Diagnosis of Ischemic Stroke in the Emergency Department in the Greater Cincinnati/Northern Kentucky Stroke Study." Academic Emergency Medicine, 23(10):1129-1135, 2016.

Moore, M. J. et al., "To tPA or Not to tPA: Two Medical-Legal Misadventures of Diagnosing a Cerebrovascular Accident as a Stroke Mimic." Clinical practice and cases in emergency medicine, 3(3):194-198, 2019.

Newman-Toker, D. E. et al., "Missed Diagnosis of Stroke in the Emergency Department: A Cross-Sectional Analysis of a Large Population-Based Sample." Diagnosis, 1(2):155-166, 2014.

Pavllo, D. et al., "3D Human Pose Estimation in Video with Temporal Convolutions and Semi-Supervised Training." In Conference on Computer Vision and Pattern Recognition (CVPR), 2019.

Pedregosa, F. et al. "Scikit-learn: Machine Learning in Python." Journal of Machine Learning Research, 12:2825-2830, 2011.

Popovic, D. B. et al., "Control of Movement for the Physically Disabled: Control for Rehabilitation Technology." Center for Sensory-Motor Interaction (SMI), Department of Health Science, 2003.

Ramanujam, P. et al., "Accuracy of Stroke Recognition by Emergency Medical Dispatchers and Paramedics—San Diego Experience." Prehospital Emergency Care, 12(3):307-313, 2008.

Ramesh, V. et al., "A Neurobehavioral Evaluation System Using 3D Depth Tracking & Computer Vision: The Case of Stroke-Kinect." In Proceedings of Neuroscience 2016, Annual Meeting of the Society for Neuroscience (Poster presentation), San Diego, CA, USA, Nov. 2016.

Ramesh, V. et al., "Exploring Stroke-Associated Hemiparesis Assessment with Support Vector Machines." In Proceedings of the 11th EAI International Conference on Pervasive Computing Technologies for Healthcare, pp. 464-467. ACM, 2017.

Ramesh, V. et al., "Stroke-Associated Hemiparesis Detection Using Body Joints and Support Vector Machines." In Proceedings of the 12th EAI International Conference on Pervasive Computing Technologies for Healthcare, pp. 55-58. ACM, 2018.

Randolph, J. J. "Free-Marginal Multirater Kappa (Multirater K [Free]): An Alternative to Fleiss' Fixed-Marginal Multirater Kappa." Online submission, 2005.

Sung, S.-F. et al., "Code Stroke: A Mismatch Between Number of Activation and Number of Thrombolysis." Journal of the Formosan Medical Association, 113(7):442-446, 2014.

Van Belle, V. et al., "Explaining Support Vector Machines: A Color Based Nomogram." PloS one, 11(10):e0164568, 2016.

Virani, S. S. et al., "Heart Disease and Stroke Statistics—2020 Update: A Report from The American Heart Association." Circulation, 141(9):e139-e596, 2020.

\* cited by examiner

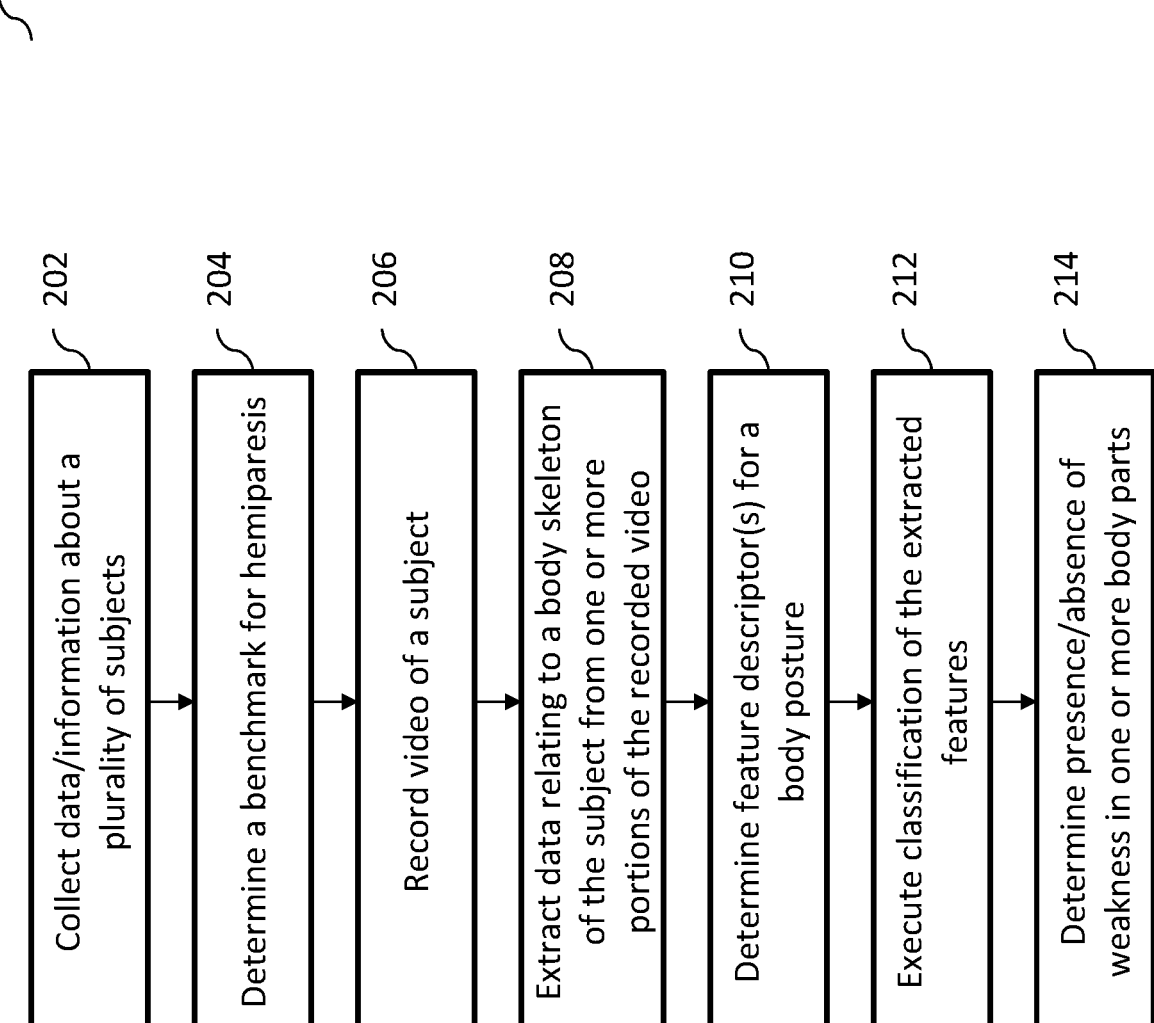

200

202 Collect data/information about a plurality of subjects

204 Determine a benchmark for hemiparesis

206 Record video of a subject

208 Extract data relating to a body skeleton of the subject from one or more portions of the recorded video 210 Determine feature descriptor(s) for a body posture 212 Execute classification of the extracted features 214 Determine presence/absence of weakness in one or more body parts

Linear SVM, Balanced Class Weight

| Experiment | Num Train | % Train | Num Test | L2 Norm | | | | Max Norm | | | |
|---|---|---|---|---|---|---|---|---|---|---|---|
| | | | | Test Accuracy | Weighted F1 | Weighted Precision | Weighted Recall | Test Accuracy | Weighted F1 | Weighted Precision | Weighted Recall |
| Leave-One-Out | 34 | 97% | 1 | 80.00% | 80.30% | 81.78% | 80.00% | 77.14% | 77.52% | 79.91% | 77.14% |
| 90/10 Split | 31 | 89% | 4 | 77.50% | 76.81% | 80.31% | 77.50% | 76.25% | 73.60% | 85.83% | 76.25% |
| 80/20 Split | 28 | 80% | 7 | 70.71% | 68.96% | 74.00% | 70.71% | 73.00% | 74.04% | 77.67% | 73.00% |
| 75/25 Split | 26 | 74% | 9 | 73.89% | 72.90% | 76.32% | 73.89% | 68.89% | 68.69% | 76.71% | 68.89% |
| 66/33 Split | 23 | 66% | 12 | 73.83% | 74.75% | 77.32% | 73.83% | 72.08% | 72.10% | 76.89% | 72.08% |
| 50/50 Split | 17 | 49% | 18 | 71.94% | 70.49% | 72.40% | 71.94% | 63.89% | 63.57% | 65.26% | 63.89% |

500

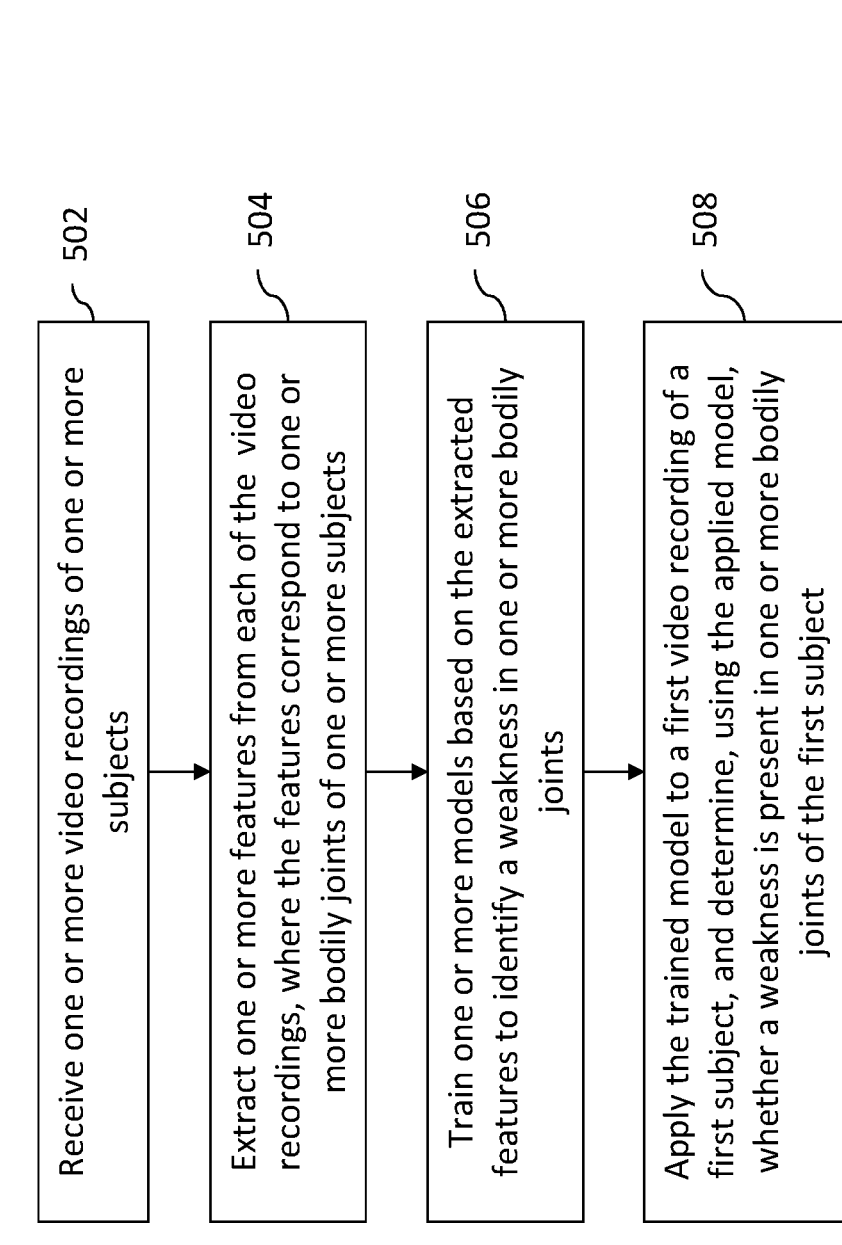

502

Receive one or more video recordings of one or more subjects

504

Extract one or more features from each of the video recordings, where the features correspond to one or more bodily joints of one or more subjects

506

Train one or more models based on the extracted features to identify a weakness in one or more bodily joints

508

Apply the trained model to a first video recording of a first subject, and determine, using the applied model, whether a weakness is present in one or more bodily joints of the first subject

FIG. 5

POSE-BASED IDENTIFICATION OF WEAKNESS

CROSS-REFERENCE TO RELATED APPLICATIONS

This application is a national stage entry of Patent Cooperation Treaty Application No. PCT/US2022/017944 filed Feb. 25, 2022, entitled "POSE-BASED IDENTIFICATION OF WEAKNESS," which claims priority to U.S. Provisional Application No. 63/153,902 filed Feb. 25, 2021, entitled "IDENTIFYING WEAKNESS IN SITTING STROKE PATIENTS BY CAPTURING NEUROLOGIST ACUMEN WITH MACHINE LEARNING," the disclosures of which are incorporated herein by reference in their entirety.

TECHNICAL FIELD

The current subject matter generally relates to data processing, and in particular, passively detecting and/or diagnosing bodily weakness for determining presence of various neurological conditions/events, including stroke.

BACKGROUND

Stroke is a major leading cause of death and disability in the US. The only therapy for stroke is utilized in less than 5% of acute strokes however because it has to be administered within 3 hours of the onset of symptoms. Accurately diagnosing a stroke as soon as possible after the onset of symptoms is tough as it requires a subjective evaluation by a stroke specialist in a hospital. Moreover, stroke outcome prediction is currently crude, and stroke deficit scales are generally unable to predict if a patient will do well or very poorly.

SUMMARY

In some implementations, the current subject matter relates to a computer implemented method for determining and/or detecting presence/absence of a weakness in one or more bodily joints of a subject. The method may include receiving, using at least one processor, one or more video recordings of one or more subjects, and extracting one or more features from each of the video recordings, where the features may correspond to one or more bodily joints of one or more subjects. The method may further include training one or more models based on the extracted features to identify a weakness in one or more bodily joints, applying the trained model to a first video recording in one or more video recordings of a first subject, and determining, using the applied model, whether a weakness is present in one or more bodily joints of the first subject.

In some implementations, the current subject matter may be configured to include one or more of the following optional features. The extracted features may correspond to one or more spatial coordinates of the one or more bodily joints. Further, the features may be extracted from a predetermined portion of the first video recording of the first subject.

In some implementations, the first video recording of the first subject may be obtained while the first subject is positioned at rest.

In some implementations, applying of the model may include determining one or more spatial coordinates (e.g., x, y, z) corresponding to a position of one or more bodily joints of the first subject. A presence/absence of a weakness (in one or more bodily joints of the first subject) may be determined using the spatial coordinates corresponding to the position of one or more bodily joints of the first subject. In some implementations, the method may further include generating a covariance of the determined spatial coordinates, executing at least one of: one or more machine learning processes and/or and one or more deep learning processes using the generated covariance, and determining whether a weakness is present/absent in one or more bodily joints of the first subject based on the executed machine learning process(es) and/or deep learning process(es). Some non-limiting examples of such process(es) may include support vector machine(s) process(es).

In some implementations, training of the model may include comparing one or more spatial coordinates (e.g., coordinate x) corresponding to a position of at least one bodily joint (e.g., ankle) of the first subject to one or more spatial coordinates (e.g., coordinate z) corresponding to a position of at least another bodily joint (e.g., hip) of the first subject. A presence/absence of a weakness may be determined based on this comparing.

In some implementations, the method may further include generating one or more user interfaces displaying one or more heat maps identifying at least one of a presence and an absence of an abnormality (e.g., abnormal position, movement, expression, etc.) in one or more bodily joints of the first subject. A weakness in the bodily joints of the first subject may be determined based on at least one of the presence and the absence of the identified abnormality.

In some implementations, the method may further include triggering a generation of one or more alerts based on the determination whether a weakness is present in one or more bodily joints of the first subject, and generating one or more user interfaces for displaying the alerts.

In some implementations, the method may further include determining that the first subject is experiencing at least one neurological event based on a determination that a weakness is present in one or more bodily joints of the first subject. The neurological event may include at least one of the following: an acute stroke, an ischemic stroke, a hemorrhagic stroke, a transient ischemic attack, a warning stroke, a mini-stroke, and any combination thereof.

In some implementations, at least one of the receiving, the extracting, the training, and the applying may be performed in substantially real time.

Implementations of the current subject matter can include systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to optical edge detection, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is a flow chart illustrating an exemplary method for assessing a weakness in one or more body parts of a subject (e.g., subject shown in FIG. 1), according to some implementations of the current subject matter;

FIG. 3d illustrates an exemplary table summarizing results of experiments based on an analysis of 10 seconds of the recorded video of subjects;

FIG. 5 illustrates an exemplary method, according to some implementations of the current subject matter.

DETAILED DESCRIPTION

Figure 1:
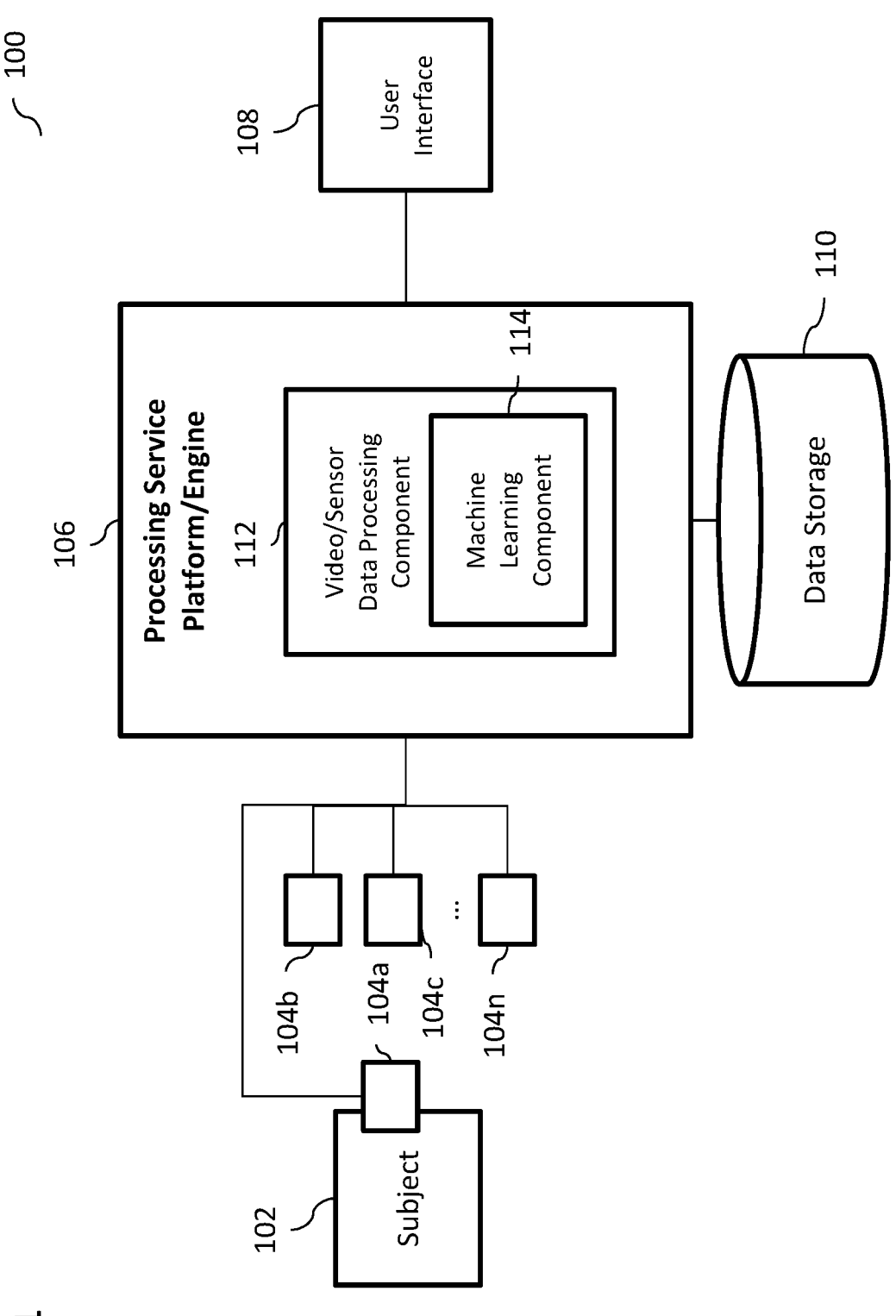
FIG. 1 illustrates an exemplary system for detecting and/or determining a bodily joint weakness in a subject, according to some implementations of the current subject matter.

One or more implementations of the current subject matter relate to methods, systems, articles of manufacture, and the like that may, among other possible advantages, provide an ability to passively detect and/or determine presence of a bodily weakness in a subject, such as, for example, for the purposes of determining/detecting/diagnosing occurrence of a neurological condition/event (e.g., a stroke) in the subject.

Stroke is a leading cause of disability and death and costs the United States $34 billion dollars a year in missed days of work, treatment, and/or rehabilitation. Early treatment of stroke improves long-term outcomes and lowers recurrent stroke risk by up to 80%. The standard of care is the administration of a clot dissolving agent, tissue plasminogen activator (tPA), within 4.5 hours of the onset of symptoms. To facilitate early treatment, hospitals see most strokes first in hospitals' emergency departments (EDs). Approximately 70% of stroke patients are admitted as inpatients from the ED.

Unfortunately, strokes are often missed or incorrectly diagnosed in the ED. A comprehensive study examining the ED visit records of hospitals across 9 states in the United States found that nearly 13% of stroke cases were diagnostic errors—a diagnosis that was missed or incorrect, as determined by a definitive test or finding done at a later time. This corresponded to 24,000 patients who received an incorrect diagnosis and were seen on a treat-and-release basis in the ED, only to be later admitted as inpatient with a confirmed stroke diagnosis. Because of the narrow treatment window of tPA and its reduced effects if administered after this window, such missed or delayed diagnoses can prove fatal and/or hurt patient's chances of rehabilitation. Another study found that 22% of stroke cases were missed in the ED. Of these, a third presented within the time window for tPA eligibility, but because they were misdiagnosed, they did not timely receive the tPA. A study assessing stroke care in Texas found that 35% of stroke and transient ischemic attack cases were missed in the ED. This last study is of particular interest because most of the patients who presented with acute neurological symptoms in the ED were not examined by neurologists but by ED physicians alone. The high rate of missed strokes by emergency medicine clinicians can be ascribed to the difficulty of distinguishing strokes from stroke mimics. There is a wide range of diseases with symptoms similar to those of stroke—seizure, encephalopathy, and brain tumors, for example—and an experienced vascular neurologist is required to be able to differentiate strokes from those that mimic them.

The cost of stroke misdiagnosis is high—65% of malpractice claims made against clinicians involved a delayed or missed ED diagnoses that harmed patients, and compensation for plaintiffs ranged from $100,000 to $30 million. There is a large cost for hospitals as well, as treating a stroke mimic increases costs by a median of over $5,000. Missed strokes have been shown to increase hospital length of stay by 2 days, corresponding to approximately $1,600 per day in costs. Most importantly, there is a large human cost—80,000 to 160,000 preventable deaths or permanent disabilities each year in the United States.

To reduce the number of incorrect stroke diagnoses, in some implementations, the current subject matter provides a computer-implemented method and/or system that may configured to determine and/or detect (e.g., passively, such as, without requiring specific actions from a subject) presence of a bodily weakness in the subject. The current subject matter may implement a machine learning (ML) model configured to learn and/or model an expertise of experienced neurologists and/or transform the captured learning to determine presence of hemiparesis and/or weakness detection, and eventually be used to correctly detect and/or diagnose a stroke (or any other neurological conditions). The current subject matter may be further configured to execute subject's pose estimation to determine one or more 3D body joint positions from one or more videos of an outpatient stroke subject, such as when the subject is sitting (and/or assuming any other pose) at rest. The current subject matter may be configured to use a covariance of body joints as a feature descriptor and a linear support vector machine classifier to detect hemiparesis from a predetermined segment (e.g., 10 seconds, etc.) of a video with a high accuracy (e.g., 80% accuracy, 82% precision, 80% recall, etc.).

Advantageously, the current subject matter's ML processes may be deployed as part of a clinical decision support system for automatic stroke assessment in emergency settings and/or without ready access to experts (e.g., neurologists), to reduce missed strokes (e.g., in the ED, at home, and/or any other settings) and ultimately improve stroke patient outcomes. Further, the current subject matter system may automatically identify acute stroke symptoms when present and may help ED physicians to not only accurately distinguish stroke from stroke mimics but also reduce time to diagnose and/or rule out stroke. Such a system especially benefits hospitals in underserved areas without ready access to neurologists nor a comprehensive stroke center.

As stated above, the current subject matter's ML-based system may be configured to focus on automatically identifying bodily joint weakness, or hemiparesis. Hemiparesis is a partial paralysis of the left and/or right side of the body and is typically, a common, early warning sign of a stroke. It is characterized by a difficulty moving the limbs of the affected side and is, conventionally, identified by neurologists using a set of motor arm and/or leg tests.

To identify such bodily joint weakness in a subject, the current subject matter may be configured to analyze a video of the subject, while that subject is at rest (e.g., without requiring the subject to perform any specific actions). The analysis may involve review of predetermined segments of the video (e.g., 10 seconds, etc.) and extract various features. A support vector machine (SVM) classifier may then be used to identify hemiparesis with high accuracy and that body posture at rest was indicative of the presence or absence of hemiparesis. That is, the way patients orient themselves in 3D space at rest is indicative of bodily joint weakness as hemiparetic patients have difficulty maintaining their posture and/or balance.

In some implementations, the current subject matter relates to system(s), method(s), and/or article(s) of manufacture for identifying presence and/or absence of a bodily joint weakness in a subject. The presence/absence of the bodily joint weakness in the patient may be determined using passive (and/or active) methods of observation. For example, the subject, while at rest, e.g., sitting, laying down, partially laying down, standing, and/or assuming any other pose, may be filmed during a predetermined period of time. During filming, the subject might not be asked to perform any specific tasks (e.g., move the arm, leg, speak, etc.). Alternatively or in addition, the subject may be asked to perform one or more tasks.

In some exemplary implementations, subjects may be recorded using various sensors, e.g., a video camera, audio microphone (e.g., in a smartphone, a tablet, etc. ("sensing device")). Subjects may be recorded passively and/or at rest and/or while a clinician and/or first responder conducts a neurological examination, a series of motor and cognitive tests. The sensor data processing unit may be configured to function to extract biological features that may be used by the stroke symptom detector from video and audio feeds. The sensor data processing unit may include a set of sensor data extraction processes for each type of biological feature required by the stroke symptom detector. For example, a speech process may produce representations of a subject's vocal patterns from raw speech; this type of biological feature is used by the stroke symptom detector to identify the presence or absence of dysarthria or slurred speech, a stroke symptom. Similarly, the face process may extract relevant keypoints in a subject's face from video for facial paralysis detection. The sensor data processing unit may also include a pupil process that may track the subject's pupil and eye movements, a body joint process that may track the spatial coordinates of the subject's body joints, and a finger tracking process that may monitor the movements of the hands and fingers, and/or any other processes. The sensor data processing unit may be wholly and/or partially instantiated in a remote cloud hosted platform and/or on the sensing device.

In some implementations, the stroke symptom detector may be a suite of signal processing and machine learning algorithms that may be trained to detect the presence or absence of acute stroke symptoms such as dysarthria, aphasia, facial paralysis, gaze deficit, nystagmus, body joint weakness, hemiparesis, ataxia, dyssynergia, dysmetria, and/or any combination thereof. The severity of each symptom may also be scored by the stroke symptom detector. Furthermore, the stroke symptom detector functions to predict the likelihood of the most probably types of stroke in a subject, based on the symptoms detected. As with the sensor data processing unit, the stroke symptom detector may be wholly and/or partially located in a remote cloud hosted platform and/or on the sensing device. Since the extraction of biological features from sensor data and the use of such features to detect stroke symptoms with machine learning are both susceptible to inaccuracies in different scenarios, there may be a cross talk between the two components to minimize errors. For example, if poor lighting results in an inaccurate detection of facial paralysis by the stroke symptom detector, the face process may be modified to accommodate for those environmental conditions.

In some implementations, the current subject matter's monitor system may function to inform an entity (a clinician, first responder, a home caregiver, a family member, etc.) of the status of a monitored subject. The monitor system may display one or more predictions of the stroke symptom detector (e.g., the presence of a symptom and its severity on a color scale) and may additionally receive live and/or capture video, images, and/or audio from the sensing device. Biological features extracted by the sensor data processing unit may also be displayed on the monitor system, either directly or via abstracted representations. The monitor system may be an application and/or web site accessible by a smartphone or tablet that can be the same as the sensing device. The monitor system may additionally include a user interface for accepting user (e.g., a clinician, a medical professional, etc.) input, such as the scores from a neurological examination.

Moreover, in some exemplary, non-limiting implementations, the current subject matter process(es) may be configured to provide automatic detection of stroke symptoms of one or more subjects in a real-time and/or substantially real-time simply from an audio, a video, and/or any other sensory data. The subjects may be passively observed without requiring them to perform some action and/or hold some position. The current subject matter may also determine and/or display a likelihood of a particular type of stroke based on symptoms that were detected and/or analyzed. Further, the current subject matter may be configured to provide a stroke signature for an individual, an easily interpretable indicator of the overall severity of stroke symptoms over time.

In some implementations, the current subject matter may be configured to have one or more of the following advantages and/or applications. As one of the exemplary applications, the current subject matter may be applied as a clinical decision support system for acute stroke diagnosis in emergency departments, such as to facilitate the diagnosis of stroke by emergency medicine physicians in the absence of expert neurologists. As another exemplary application, the current subject matter may be used for a field diagnosis. For example, first responders and/or emergency crews may use the current subject matter system to automatically detect stroke symptoms of an individual in a field and inform triage. As yet another exemplary application, the current subject matter system may be used in various medical and/or non-medical facilities (e.g., nursing homes, hospitals, clinics, medical offices, elderly care facilities, homes etc.) to provide a individuals and/or clinicians a tool for remote monitoring of stroke symptoms in at-risk individuals. As yet a further exemplary application, the current subject matter system may be used to track the severity of symptoms in rehabilitating stroke subjects over time.

In some implementations, the current subject matter may be configured to include one or more machine learning and/or signal processing pipelines to analyze data acquired through one or more sensors, video cameras, image cameras, audio sensors, depth cameras as well as other technology medical technology, e.g., EEG headsets, etc. in a symptom-specific way. For example, the current subject matter system may be configured to track pupil saccades and/or nystagmus events for the purposes of performing computer vision analysis and/or signal processing. To identify hemiparesis, the current subject matter system may be configured to use machine learning. Further, a user interface may be generated to display predictions/assessments generated by the current subject matter. Additionally, inputs submitted by users (e.g., medical personnel, clinicians, etc.) relating to own assessments may be accepted by the system and used to perform further analysis in determining occurrence of a stroke. The current subject matter may be designed to aid in stroke diagnosis in acute emergency settings as well as assessments performed in rehabilitation settings (e.g., tracking patient symptoms over time).

FIG. 1 illustrates an exemplary system 100 for detecting and/or determining a bodily joint weakness in a subject, according to some implementations of the current subject matter. The system 100 may include one or more sensor devices 104(a, b, c, . . . n) that may be used to monitor, sense and/or observe a subject 102 and/or detect various symptoms associated with the subject 102. The system 100 may also include a processing service platform and/or engine 106, a user interface 108, and a data storage 110. The system 100 may be configured to operate in one or more cloud computing environments.

The engine 106 may include one or more computing elements (which may, for example, as discussed below, include one or more processors, one or more servers, one or more computing engines, one or more memory and/or storage locations, one or more databases, etc.) such as, video/sensor data processing component 112 and a machine learning component 114. The system 100 may be configured to provide an end user (e.g., a medical professional, a lay person, etc.) with an indication of whether the subject 102 is or is not experiencing a bodily joint weakness (e.g., a weakness in one or more bodily parts, such as, for instance, but limited to, arms, legs, torso, face, neck, etc., and/or an entire body), which may in turn, be an indicator that the subject 102 may be experiencing a neurological condition, e.g., a stroke. Such indication may be based on an analysis of data received from the sensors, as will be discussed below.

The processing service platform/engine 106 may include a processor, a memory, and/or any combination of hardware/ software, and may be configured to analyze data obtained from the sensors 104 to determine whether the subject 102 is or is not experiencing a bodily joint weakness. The engine 106 may be configured to include one or more processing and/or machine learning pipelines and/or implement one or more machine learning models, such as, machine learning component 114, to determine whether the subject 102 is or is not experiencing a bodily joint weakness. The engine 106 may be configured to cause generation of various user interface screens, heat maps, alerts and/or indications relating to whether the subject 102 may be experiencing such bodily joint weakness and which part(s) of the body are showing such bodily joint weakness. The screens/heat maps/ alerts/indications/etc. may be graphically displayed using the user interface component 108. Additionally, any obtained data and/or results of evaluation may be stored in a storage location and/or a data storage 110. A computing component (e.g., component 104-114) may refer to a piece of software code that may be configured to perform a particular function, a piece and/or a set of data (e.g., data unique to a particular subject and/or data available to a plurality of subjects) and/or configuration data used to create, modify, etc. one or more software functionalities to a particular user and/or a set of users. The engine 106 may include one or more artificial intelligence and/or learning capabilities that may rely on and/or use various data, e.g., data related to and/or identifying one or more symptoms and/or parameters associated with the subject 102 that have been currently obtained (e.g., as a result of filming, monitoring, detecting, etc. by sensors 104), previously obtained (e.g., by sensors 104, and/or determined by the engine 106) and/or generated by the engine 106.

In some implementations, the data that may be received and/or processed by the engine 106 may include any data, metadata, structured content data, unstructured content data, embedded data, nested data, hard disk data, memory card data, cellular telephone memory data, smartphone memory data, main memory images and/or data, forensic containers, zip files, files, memory images, and/or any other data/ information. The input and/or the output data (as generated by the engine 106) may be in various formats, such as text, numerical, alpha-numerical, hierarchically arranged data, table data, email messages, text files, video, audio, graphics, etc. One or more of the above data may be collected in real-time, continuously, during predetermined periods of time, periodically (e.g., at certain preset periods of time, e.g., every 30 seconds, every 5 minutes, every hour, etc.). The data may be queried upon execution of a certain feature of the current subject matter process.

The system 100 may be configured to include one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

Referring back to FIG. 1, one or more sensors 104 may include a video camera configured to take a video and/or film the subject 102 (e.g., a patient at a medical facility and/or any other individual being observed by the system 100), while the subject 102 is at rest, e.g., sitting, laying down, partially laying down, and/or be positioned in any other pose. Alternatively, or in addition to, the sensors 104 may be positioned directly on the subject 102 and may include leads that may be attached to the subject 102 to detect and/or monitor various physiological, neurological, biological, movement, health, and/or other parameters of and/or associated with the subject 102, which may be indicative of various symptoms that may the subject 102 may be exhibiting and/or experiencing. The sensors 104 may also be positioned remotely from the subject 102. The remotely positioned sensors 104 may include one or more video, audio, graphics, textual, etc. capturing and/or video, audio, graphics, textual, etc. capable devices (e.g., cameras, smartphone devices, tablet devices, etc.). As stated above, such devices may be configured to take a video of the subject 102 and/or record subject 102's speech. The sensors 104 may be configured to passively and/or actively monitor, observe, and/or detect physiological, neurological, biological, movement, health, and/or other parameters of and/or associated with the subject 102.

Alternatively, or in addition to, various data may be supplied to the engine 106, for instance, through the user interface 108 and/or queried from the data storage 110. The data may include, but is not limited to subject's personal data (e.g., name, gender, address, etc.), various health data (e.g., weight, age, medical conditions, cholesterol levels, etc.), one or more biological parameters (e.g., an electrocardiogram, an electroencephalogram, a blood pressure, pulse, etc.) and/or any other data, and/or any combination thereof), etc. In some implementations, the data may be queried by the engine 104 from the data storage 110 and/or one or more third party databases. The engine 104 may determine which database may contain requisite information and then connect with that database to execute a query and retrieve appropriate information. In some implementations, the engine 106 can include various application programming interfaces (APIs) and/or communication interfaces that may allow interfacing with other components of the system 100.

Moreover, the engine 104 may receive expert (e.g., neurologist) data for processing and/or training any machine learning models to determine whether the subject 102 may be experiencing a weakness in one or more body parts. The expert data may include data associated with various symptoms associated with specific neurological conditions. It may also include various data sets collected from neurological (and/or other type of) examinations of patients at various medical facilities. As can be understood, any desired data may be supplied to the engine 106 for processing.

In some implementations, the engine 106 may be configured to receive and process, using video/sensor data processing component 112, the data (e.g., either from sensors 104, user interface 108, and/or data storage 110) and perform an assessment of whether the subject 102 may or may not be experiencing a weakness in one or more body parts. The engine 106 may be configured to apply one or more machine learning models to analyze which parts of the subject's body may be experiencing weakness and/or other abnormal conditions. The engine 106 may be configured to use the machine learning component 114 that may be configured to store such machine learning models and/or perform various machine learning and/or artificial intelligence processes, as discussed below.

In some exemplary implementations, the engine 106, using component 114, may be configured to distinguish between different types of data (e.g., based on a type of sensor 104 that is supplying data to the engine 106, e.g., audio, video, etc.) to ascertain and/or analyze various symptoms experienced by the subject 102. For example, data received from an audio sensor 104 may be used to determine and/or analyze one or more speech patterns of the subject. The engine 106 may invoke a machine learning model that may be trained specifically to analyze speech (e.g., through analysis of natural language processing, audio levels, clarity of speech, etc.) to determine whether the subject 102 is exhibiting, for example, dysarthria, aphasia, and/or any other speech-related symptoms/conditions.

Data received from a video sensor 104 that may be configured to monitor body joint positions and/or movements of the subject 102. For example, such body joints may include, but are not limited to, fingers, shoulders, elbows, knees, head, spine, etc. The engine 106 may be configured to determine (e.g., through using a machine learning model trained to analyze positions and/or movements of body joints, as discussed below) whether the subject 102 is exhibiting weakness (e.g., including hemiparesis), ataxia (e.g., including dyssynergia, dysmetria, etc.), and/or any other body joint symptoms/conditions.

In some implementations, the engine 106 may be configured to use a single machine learning model and/or multiple machine learning models that may be trained using a single and/or different training data sets for assessing presence of weakness in one or more body parts of the subject 102. In some cases, the engine 106 may be configured to perform a comparison between different parts of the body to determine presence of a weakness in part of the body (e.g., a left arm) versus another part of the body (e.g., a right arm, a torso, a leg, etc.) of the subject 102. Alternatively or in addition to, the engine 106 may be configured to use a healthy body template data set to determine whether weakness may exist in one or more parts of the subject's body. Moreover, one or more threshold values may be used to determine presence of weakness in body of the subject 102 and/or any part thereof. Upon determining presence and/or absence of weakness, the engine 106 may be configured to display (e.g., on the user interface 108) an appropriate screen, heat map, indication, alert, etc.

Based on the analysis of bodily weakness in the subject 102, the engine 106 may then be configured to generate a prediction that the subject 102 may or may not be experiencing at least one neurological disorder (e.g., a stroke). Additionally, based on a determination of weakness in a particular body part, the engine 106 may be configured to determine a type of neurological disorder being experienced by the subject 102. For example, the engine 106 may be configured to determine that the subject 102 is experiencing an acute stroke, an ischemic stroke, a hemorrhagic stroke, a transient ischemic attack, a warning stroke, a mini-stroke, and any combination thereof.

Once the engine 106 determines that the subject 102 may or may not be experiencing a neurological condition (e.g., a stroke), the engine 106's monitoring system 116 may be configured to trigger generation of one or more alerts based on the above prediction. The alerts may be displayed on the user interface 108. The alerts may include a visual, an audio, a graphical, and/or any other indicators. The alerts may be specific to a particular part of the subject 102 (e.g., a body part, a physiological parameter (e.g., blood pressure, pulse, etc.)) that may be exhibiting above normal (e.g., exceeding a corresponding threshold value) values. The alert may be an overall alert that may be indicative of the subject experiencing a neurological condition, e.g., a stroke. The engine 106 may be configured to cause a specific graphical arrangement of the alerts and/or any other indicators on the user interface 108.

In some implementations, the alerts may be transmitted to one or more systems (e.g., hospitals, clinics, first responders, etc.) for evaluation and/or subsequent action. In some implementations, the system 100 and/or any of the processes performed by any of its components may be configured to operate in real time and/or substantially in real-time.

In some implementations, the system 100 may be configured to perform continuous monitoring of the subject 102. The monitoring (including obtaining new data from sensors 104 and/or being entered by a user (e.g., medical professional, clinician, home user, etc.) of the system 100) may be performed during predetermined periods of time and/or for a predetermined period of time. By way of a non-limiting example, monitoring may be performed for 30 seconds at a time during a period of 10 minutes (and/or during any other periods of time and/or frequency of monitoring). This may allow the system 100 to determine whether the subject 102 is truly experiencing symptoms indicative of a particular neurological condition and/or whether some determined symptoms may been in error.

Moreover, any such monitoring may be performed passively and/or actively. Passive monitoring of the subject 102 may include observing the subject 102 without requiring the subject 102 to perform any specific actions (e.g., move arms, move head, blink an eye, speak a certain phrase, etc.). Active monitoring may require the subject 102 to perform specific actions.

The engine 106 may use any updated data/information obtained as a result of the continuous monitoring of the subject 102 to further assess weakness in the body of the subject 102. Such further assessments may be different from the prior assessments and/or further be indicative of the presence of a particular neurological condition.

FIG. 2 is a flow chart illustrating an exemplary method 200 for assessing a weakness in one or more body parts of a subject (e.g., subject 102 shown in FIG. 1), according to some implementations of the current subject matter. The method 200 may be performed by one or more components of the system 100 shown in FIG. 1 (e.g., engine 106).

At 202, the engine 106 may be configured to obtain various data and/or information relating to a plurality of subjects. For example, the plurality of subjects may include patients that may have been observed, treated, etc. at a medical facility (e.g., hospital). The obtained data may be compliant with appropriate HIPAA protocols to ensure confidentiality of patients. The data may include, for example, but is not limited to, audio, high-definition video at 60 frames per second, and depth footage of subjects, x, y, z spatial coordinates of one or more (e.g., 25) body joints of subjects over time. The data may include recordings (e.g., video, audio, etc.) of subjects during a set of motor and cognitive evaluation exams (e.g., using the National Institute of Health Stroke Scale (NIHSS)). The data may also be indicative of whether hemiparesis was identified and/or its severity as assessed through motor arm and/or leg tests (e.g., as conducted by a trained stroke specialist). The subjects may be recorded while they are sitting at rest, laying down, partially laying down, and/or assuming any other pose (e.g., while waiting for a neurologist to begin an in-person assessments). The subjects may be recorded from 10 seconds to 2 minutes. The engine 106 may be configured to use the above data to generate a training set for one or more machine learning models that may be used to determine presence and/or absence of a weakness in one or more body parts of a subject.

At 204, the engine 106 may be configured to determine a benchmark for the weakness in one or more body parts of the subject. In some implementations, one or more separate benchmarks may be determined for each body part and/or a combined benchmark may be determined for all body parts of the subject. The benchmark may be confirmed to serve as a baseline against which to compare performance of the current subject matter's machine learning model(s). In some implementations, an expert feedback (e.g., from neurologists, clinicians, etc.) may be used when determining the benchmark(s). For example, such experts may view recorded videos of subjects sitting at rest (e.g., for 10 seconds to 2 minutes depending on the subject) as well as undergoing NIHSS motor tests and provide responses for each type of video shown. The responses may be used as input into a machine learning pipeline. Average accuracy may be determined by comparing expert responses on whether a subject was hemiparetic with the results from the in-person motor exam of the subject.

One of the benefits of the current subject matter's diagnostic tool is that it may be configured to perform consistently across multiple subject evaluations, whereas human evaluation can give inconsistent results based on a particular individual conducting the NIHSS examination. To gauge this inconsistency, an inter-rater reliability using the free-marginal multi-rater kappa coefficient, $\kappa_{free}$ may be determined. This type of kappa coefficient is suitable for cases involving more than two raters and for which raters are not informed beforehand of the number of subjects that fall into each category. The free-marginal multi-rater kappa coefficient may be determined using the following:

$$\kappa_{free} = \frac{\left[\frac{1}{Nn(n-1)}\left(\sum_{i=1}^{N}\sum_{j=1}^{K}n_{ij}^2 - Nn\right)\right] - \left[\frac{1}{k}\right]}{1 - \left[\frac{1}{k}\right]} \tag{1}$$

where N is the number of subjects evaluated via video, n is the number of raters, and k is the total number of categories into which the subjects may be placed. The coefficient $\kappa_{free}$ may be determined for each of the two sets of participant responses. A $\kappa_{free}$ value of 0 may indicate that there is no consistency in the responses of raters, while a value of 1 may indicate a perfect consistency. In some exemplary, experimental implementations, a value of 0.75 may be used for gauging good or bad inter-rater reliability, where $\kappa_{free}>0.75$ may be considered to correspond to good reliability.

Referring back to FIG. 2, at 206, a video of the subject 102 may be recorded using one or more cameras 104. The engine 106 may be configured to use video of the subject to extract various data relating to body skeleton of the subject 102 from at least a portion of the recorded video and estimate a pose of the subject 102 (e.g., using an existing deep learning approach for 3D human pose estimation), at 208. Based on the estimated pose, the engine 106 may be configured to generate a N-joint (e.g., N=17) body skeletons for the subject 102 (as shown, for example, in FIG. 3a).

In some implementations, the subject may be recorded at rest for a predetermined period of time (e.g., at least 10 seconds). The engine 106 may also be configured to consider a predetermined duration (e.g., the first 10 seconds) of the recorded video for the purposes of determining body skeletons, at 208. For example, at 60 frames per second for X seconds of video, the engine 106 may be configured to process T=60*X total frames. For each frame t out of T total frames, the engine 106 may determine spatial coordinates: x (left/right), y (up/down), and z (toward/away from camera 104) of each and/or all body joints for the subject 102 (and/or each subject being evaluated). The engine 106 may then define a vector S as a vector of all joint locations (e.g., 17 joints, each corresponding to a set of three spatial coordinates x, y, and z at time t) for the subject 102 (or for each subject being evaluated):

$$S = [x_1, \ldots, x_{17}, y_1, \ldots, y_{17}, z_1, \ldots, z_{17}]' \quad (|S| = 51) \qquad (2)$$

At 210, the engine 106 may be configured to determine a feature descriptor(s) for a body posture of the subject 102. Body posture at rest may be indicative of bodily joint weakness or hemiparesis. Since the subject 102 is at rest (e.g., does not significantly move around during the predetermined period of time (e.g., 10 seconds)), the engine 106 may be configured to process each frame of the recorded video as being independent from the next frame. Thus, the recorded video of the subject 102 may be configured to generate T samples, which he engine 106 may be configured to determine a mean $\tilde{S}$.

To obtain a feature descriptor for body posture, the engine 106 may determine a covariance matrix from one or more 3D joint locations for the subject 102. The engine 106 may also generate a user interface 108 to visualize the determined covariance matrix in a form of a heat map (e.g., as shown in FIG. 3b). The covariance matrix may be configured to describe whether 3D body joint positions correlate positively with each other, negatively with each, and/or do not correlate, and/or to what extent. The engine 106 may determine the covariance matrix Cov(S) as follows:

$$\text{Cov}(S) = \frac{1}{T-1} \sum_{t=1}^{T} (S - \tilde{S})(S - \tilde{S})' \qquad (3)$$

where ' is a transpose operator.

The subject 102 may have T vectors S using which the engine 106 may determine the covariance matrix for that subject was. T may be defined to be the frame rate of video capture, e.g., 60 frames per second, multiplied with the duration of video in seconds, X, as defined above. In some exemplary, non-limiting, experimental implementations, X may have a value between 1 second and 10 seconds (e.g., T being between 60 and 600 frames). This allows the engine 106 (advantageously) to use only a few samples per subject 102 for good classification performance.

In some exemplary, non-limiting implementations, the sample covariance matrix, Cov(S), may be a symmetric M×M matrix (e.g., M=51 corresponding to a set of spatial coordinates, x, y, and z per each body joint (17 in total) evaluated by the engine 106) and thus, the engine 106 may analyze only the upper triangle, U, of the covariance matrix. As can be understood, the engine 106 may evaluate any number of joints for the purposes of determining presence/ absence of bodily joint weakness/hemiparesis. The engine 106 may then perform flattening of the upper triangle U of covariance matrix Cov(S) to generate a vector $U_{flat}$, where the flattened vector may have a length $|S|(|S|+1)/2=1326$, where $U_{flat}=[u_1, u_2, \ldots, u_{1326}]$. As a result, the engine 106 may be configured to generate a set having a predetermined number of descriptors (e.g., 35) for a body posture of the subject 102.

Referring back to FIG. 2, at 212, the engine 106 may be configured to execute classification of the bodily joint weakness for the subject 102 using existing support vector machine processes (e.g., as available from https://scikit-learn.org/). In some implementations, to classify hemiparesis from covariance descriptors (as determined at 210), the engine 106 may execute a conventional C-support vector classification. Support vector machine processes may refer to a set of supervised learning methods that may be used for classification, regression and/or outliers detection. The support vector machines may be effectively used in high dimensional spaces as well as in scenarios where a number of dimensions is greater than the number of samples. Further, support vector machines may be configured to use a subset of training points in a decision function (i.e., support vectors), thereby allowing efficient memory use. Additionally, different kernel (common and/or custom) functions may be specified for such decision function. Moreover, use of linear kernels may enable maximizing classification performance and determining top features (e.g., top 10 features) that contribute the most towards classification (i.e., features with the greatest weights), where identification of support vectors that influence a decision boundary may be intuitive for a linear kernel, while identifying support vectors may be difficult with nonlinear kernels that implicitly map features to high-dimensional spaces that are difficult to comprehend or visualize.

Some examples of the top features may include, but are not limited to, left ankle's z-coordinates (Cov(AnkleLeftZ, AnkleLeftZ)), left wrist's y-coordinates (Cov(WristLeftY, WristLeftY), right wrist's y-coordinates (Cov(WristRightY, WristRightY)), left ankle's x-coordinates (Cov(AnkleLeftX, AnkleLeftX)), z-coordinates of the right ankle and head (Cov(AnkleRightZ, HeadZ)), right ankle's y-coordinates (Cov(AnkleRightY, AnkleRightY)), right ankle's y- and z-coordinates (Cov(AnkleRightY, AnkleRightZ)), left ankle's z-coordinates (Cov(AnkleLeftZ, WristLeftZ)), neck's x-coordinate and head's z-coordinate (Cov(NeckX, HeadZ)), and right ankle's x- and z-coordinates (Cov(AnkleRightX,) AnkleRightZ)). Thus, the above top 10 most discriminatory features for classification were the variances of left ankle, left wrist, right ankle, and right wrist and the covariances of these joints with respect to each other. This may indicate that bodily joint weakness primarily impacts the arms and legs of the subject. As such, limb positions even at rest appear to relate to hemiparesis. As can be understood, any other top features may be used by the system 100 to determine presence of bodily joint weakness.

Normalization of data may maximize performance of SVMs. The following equations may be used for normalizations:

$$L2\ Norm: \frac{U_{flat}}{\|U_{flat}\|_2} = \frac{U_{flat}}{\sqrt{u_1^2 + u_2^2 + \ldots + u_{1326}^2}} \qquad (4)$$

-continued $$\text{Max Norm: } \frac{U_{flat}}{\max(U_{flat})} = \frac{U_{flat}}{\max(u_1, u_2, \ldots, u_{1326})} \tag{5}$$

The engine 106 may be further configured to compare predictions of the SVM with the hemiparesis diagnoses from the in-person neurologist to determine raw accuracy of such predictions. The engine 106 may also determine a weighted F1, weighted precision, and weighted recall. Various experimental training and testing strategies may be used for comparison purposes and may include, for example, leave-one-out and 90/10, 80/20, 75/25, 66/33, and 50/50 train/test splits.

During an experimental procedure involving the leave-one-out training strategy, 34 outpatient subjects were used to train a linear SVM, which was subsequently tested with 1 outpatient subject left out of the training set. This process was repeated 35 times, with each subject left out and tested exactly once. The leave-one-out training paradigm maximized the amount of data for training. It also allowed identification of problematic subjects and possible reasons why the SVM failed to make a correct prediction.

Other experimental procedures involving 90/10, 80/20, 75/25, 66/33, and 50/50 train/test Splits were used to test robustness of the classifier and its sensitivity to reducing the number of training samples. In these procedures, the system 100 randomly selected 90% of the dataset (31 outpatient subjects) for training and 10% (4 outpatient subjects) for testing. The engine 106 determined performance metrics from predictions made on the test set. This process was repeated 20 times for 20 different classifiers, each trained on a random selection of 90% of the dataset and tested on 10%. The evaluation metrics were averaged across all 20 runs to check how consistently the SVM performed. The same analysis was performed for smaller training set sizes—80/20, 75/25, 66/33, and 50/50 train/test splits. Lastly, for each of the 20 classifiers trained with 90% of the dataset, the engine 106 identified top 10 most important features. FIG. 3d illustrates an exemplary table 330 summarizing results of the above experiments based on an analysis of 10 seconds of the recorded video of subjects. The leave-one-out training strategy had highest accuracy, weighted F1, weighted precision, and weighted recall (all being greater than or equal to 80%). As the size of the training set decreased, performance of the SVM generally decreased. Regardless, all accuracies, including for the 50/50 train/test split, were greater than or equal to 70%. L2 normalization yielded slightly better SVM performance on outpatient subjects than max normalization (~3% increase in accuracy for leave-one-out).

Referring back to FIG. 2, the engine 106 may conclude the process with a determination whether a particular subject 102 is experiencing a bodily joint weakness/hemiparesis, at 214. If so, an appropriate alert may be generated by the system 100. Such alert may be used to inform medical staff, caregivers, etc. of the subject 102 that subject 102 may require further evaluation and/or care.

Figure 3A:
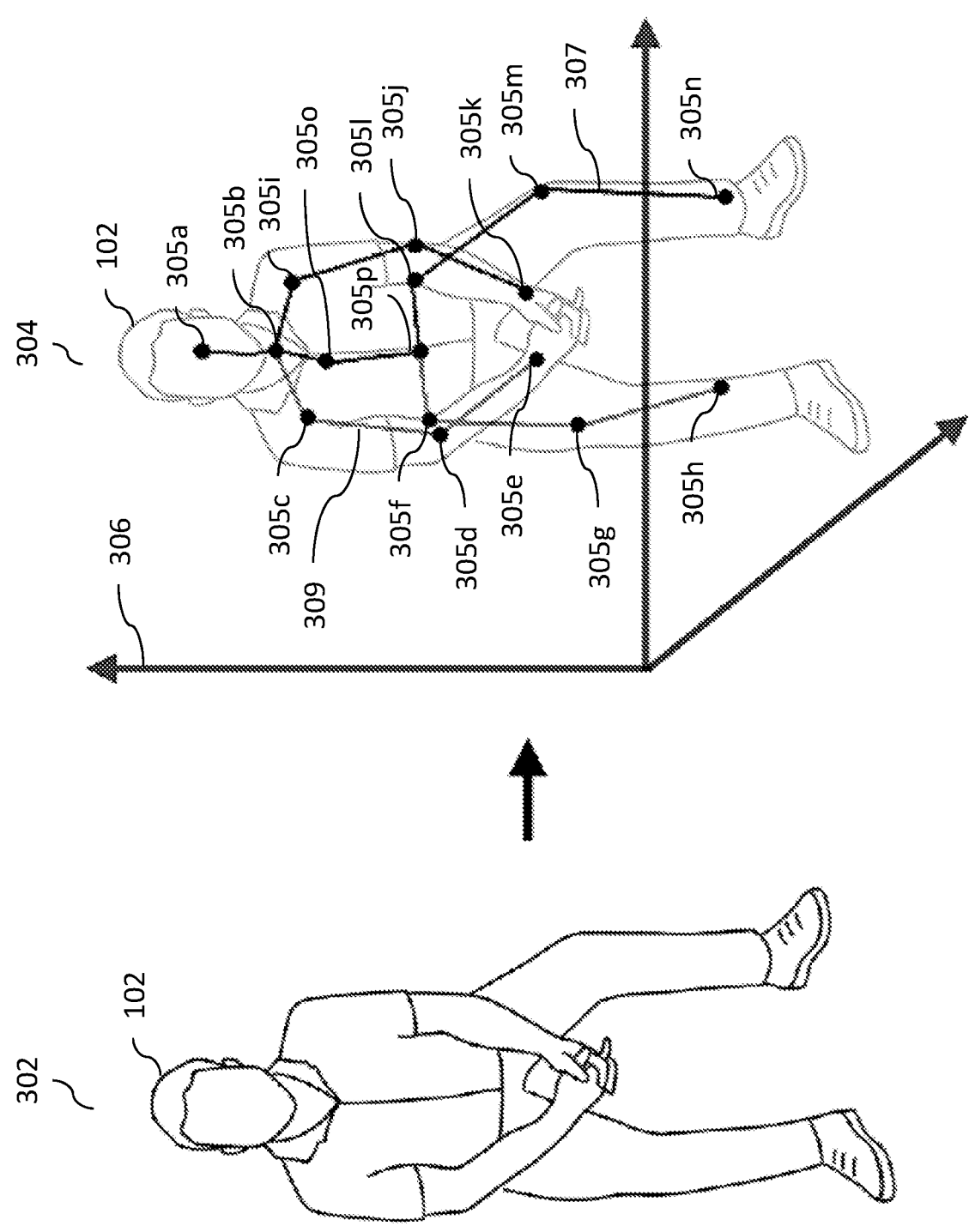
FIG. 3a illustrates exemplary visualizations of the subject that may be used by the system shown in FIG. 1 to determine presence of a bodily joint weakness, according to some implementations of the current subject matter.
Figure 3B:
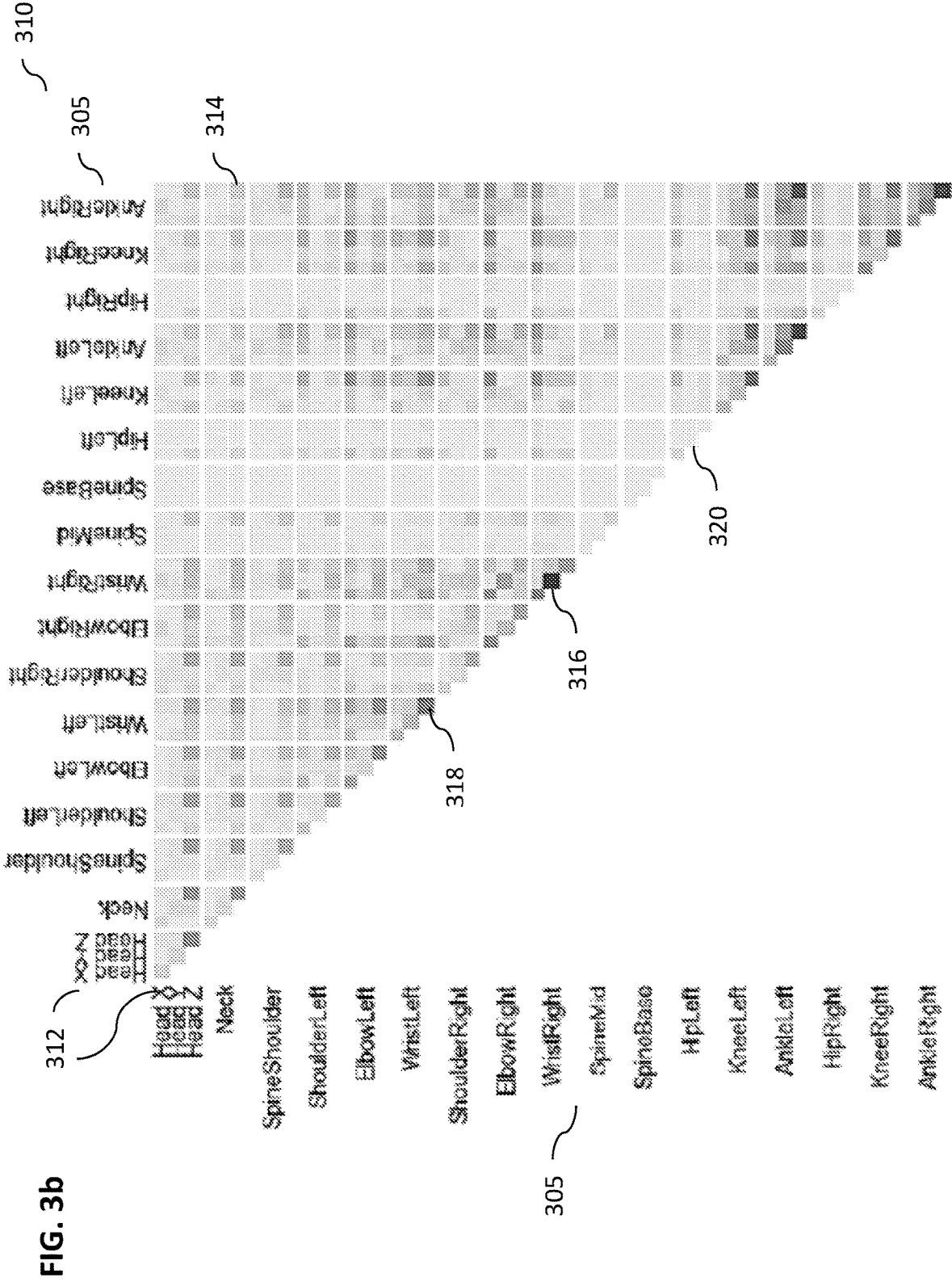
FIG. 3b illustrates an exemplary user interface that includes a heat map identifying bodily joint weakness in the subject, according to some implementations of the current subject matter.

FIG. 3a illustrates exemplary visualizations of the subject 102 that may be used by the system 100 (shown in FIG. 1) to determine presence of a bodily joint weakness, according to some implementations of the current subject matter. The subject 102 may be video-recorded (e.g., at 206 during process 200). The subject 102 may be recorded during a predetermined period of time (e.g., 8-10 minutes) while the subject is at rest. As stated above, the subject may or may not be asked to perform any specific acts for the purposes of the video and/or further evaluation. One or more frames 302 of a portion of the recorded video (e.g., 10 seconds) may be used for evaluation.

Once the video-recording of the subject 102 is complete, the system 100 (e.g., engine 106) may be configured to analyze the recording and generate a 3D image 304 of the subject 102 identifying subject's bodily joints (e.g., at 208 during process 200). The image 304 may be displayed on the user interface 108 (as shown in FIG. 1). Some examples of the identified body joints may include a head 305a, a neck 305b, a right shoulder 305c, a right elbow 305d, a right wrist 305e, a right hip 305f, a right knee 305g, a right ankle 305h, a left shoulder 305i, a left elbow 305j, a left wrist 305k, a left hip 305l, a left knee 305m, a left ankle 305n, a chest 305o, and a torso 305p. The body joints 305 may be connected by lines 307 and may be shown in a 3-dimensional Cartesian plane 306.

Upon analysis (e.g., at 210-212 during process 200) of the body joints' 305 positions, the engine 106 may be configured to determine that one or more joints may be experiencing weakness. The joints 305 and their connections that are experiencing weakness may be highlighted in a different color than the other joints (e.g., in red color). For example, right shoulder 305c, right elbow 305d, and right wrist 305e and their connections 309 may be shown in a different color than the remaining body joints indicating that there is weakness in these body joints.

The engine 106 may also be configured to generate one or more exemplary heat maps 310, as shown in FIG. 3b. The heat map 310 may also be displayed on the user interface 108 (shown in FIG. 1). The heat map 310 may identify each of the body joints 305 that has been evaluated (using the recorded video during the process 200) by the engine 106 for presence of weakness. It may also identify spatial coordinates x, y, z 312 for each of the body joints 305 along which evaluation has been performed. The heat map 310 may display a plurality of squares 314, whereby each square may have a different color and/or shading being indicative of whether weakness and/or degree of weakness present in a particular body joint and spatial direction (e.g., corresponding to a particular spatial coordinate). The coloring/shading of the squares 314 may correspond to visualization of the determinations of the weakness in the bodily joints as produced by the process 200. Moreover, the heat map 310 may be configured to illustrate a comparison between one body joint's positions/movement in relation and another body joint's positions/movement for each spatial coordinate x, y, z.

For example, as shown in FIG. 3b, a dark square 316 may illustrate that a severe weakness was observed in the right wrist of the subject 102 along y-coordinate. A less severe weakness was observed in the left wrist of the subject 102 along a z-coordinate, as shown by a slightly less dark color square 318. Further, no weakness was observed along y coordinate in the left hip of the subject 102, as shown by the square 320.

Figure 3C:
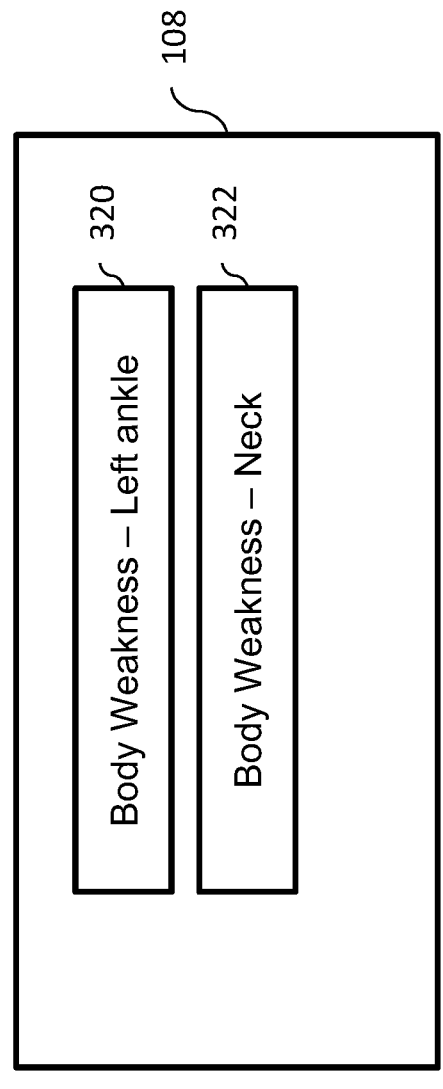
FIG. 3c illustrates an exemplary user interface that may be used to display presence and/or absence of weakness in the body joints of the subject, according to some implementations of the current subject matter.

FIG. 3c illustrates an exemplary user interface 108 that may be used to display presence and/or absence of weakness in the body joints of the subject, according to some implementations of the current subject matter. As shown in FIG. 3c, after execution of the process 200, the system 100 (shown in FIG. 1), the user interface 108 may display an indication 320 stating that bodily joint weakness is present in the left ankle and an indication 322 stating that bodily joint weakness is present in the neck of the subject 102. As can be understood, any other additional information and/or data may be shown in the user interface 108 (e.g., along which spatial coordinates, the weakness was observed, etc.).

As stated above, some of the advantages of the system 100, as shown in FIGS. 1-3*d*, may include an ability to observe the subject 102 and determine whether the subject is or is not experiencing a weakness in one or more bodily joints, and hence, may be experiencing a particular neurological condition and/or event, such as, a stroke. Such observations may be passive, whereby the subject is not required to perform any specific activities. The current subject matter system may further be used by an untrained individual to determine whether the subject 102 is experiencing a particular neurological condition and/or event to allow such individual to quickly obtain qualified medical help. This may be helpful in a multitude of settings, e.g., homes, businesses, hospitals, clinics, elderly care facilities, public transportation, public spaces, etc.

Figure 4:
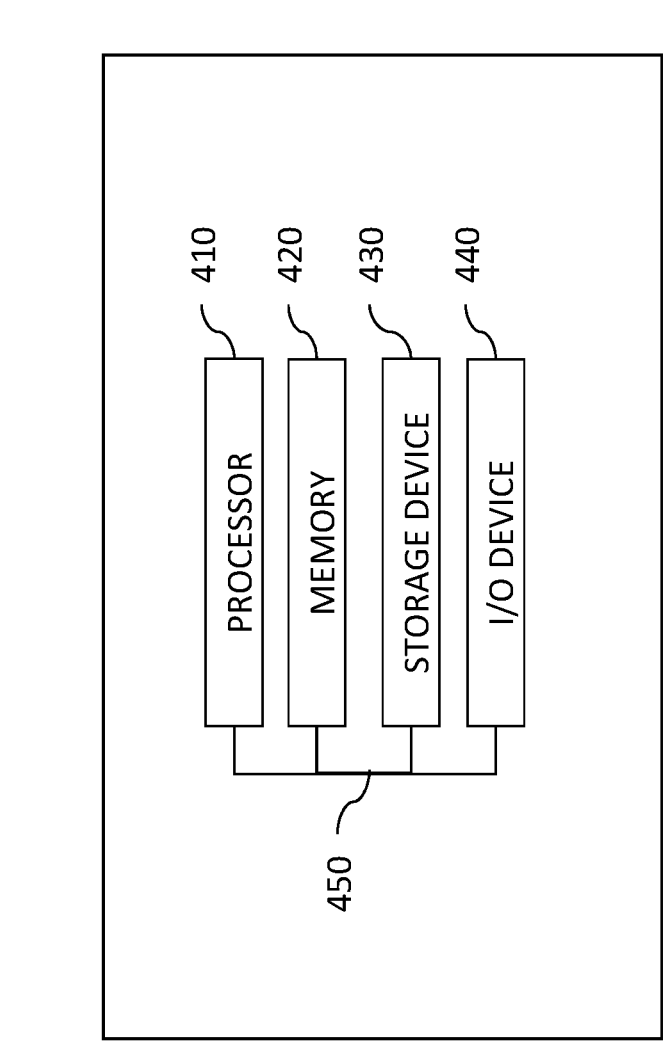
FIG. 4 illustrates an exemplary system, according to some implementations of the current subject matter.

FIG. 4 depicts a block diagram illustrating a computing system 400 consistent with implementations of the current subject matter. For example, the system 400 can be used to implement the devices and/or system disclosed herein (e.g., host one or more aspect of FIG. 1). As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the trusted server, client devices (parties), and/or the like. In some implementations of the current subject matter, the processor 410 can be a single-threaded processor. Alternately, the processor 410 can be a multi-threaded processor. The processor may be a multi-core processor having a plurality or processors or a single core processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

FIG. 5 illustrates an exemplary process 500 for detecting and/or determining presence and/or absence of a weakness in one or more bodily joints of a subject (e.g., subject 102 shown in FIG. 1) and hence, subsequently, determining occurrence of a neurological condition, disorder, event ("event") in the subject, according to some implementations of the current subject matter. The process 500 may be configured to be performed by the system 100 shown in FIG. 1 and may incorporate one or more operations of the process 200 shown in FIG. 2. The process 500 may be configured to generate one or more user interfaces 302, 304, 310, etc. as shown in FIGS. 3*a-d*. In particular, the engine 106, as shown in FIG. 1, may be configured to perform one or more operations of the process 500.

At 502, the engine 106 (or any other processor) may be configured to receive one or more video recordings of one or more subjects (e.g., subjects 102). The video recordings may be recorded using one or more sensors 104 (as shown in FIG. 1). Any other data may also be collected about the subject(s) (e.g., as shown by operations 202-206 in FIG. 2).

At 504, the engine 106 may be configured to extract one or more features (e.g., similar to the operation 208 shown in FIG. 2) from each of the one or more video recordings. The recordings may be made for a predetermined period of time. The features may correspond to one or more bodily joints of the subject(s). Feature descriptors may also be determined (e.g., as shown by operations 210 in FIG. 2).

At 506, the engine 106 may be configured to train one or more models based on the extracted features to identify a weakness in the bodily joints of the subjects. The trained model may be applied to a first video recording of first subject (e.g., subject 102). The engine 106 may then determine, using the applied model, whether a weakness is present in one or more bodily joints of the first subject, at 508. This process is similar to operations 212-214 shown in FIG. 2.

In some implementations, the current subject matter may be configured to include one or more of the following optional features. The extracted features may correspond to one or more spatial coordinates of the one or more bodily joints. Further, the features may be extracted from a predetermined portion of the first video recording of the first subject.

In some implementations, the first video recording of the first subject may be obtained while the first subject is positioned at rest.

In some implementations, applying of the model may include determining one or more spatial coordinates (e.g., x, y, z) corresponding to a position of one or more bodily joints of the first subject. A presence/absence of a weakness (in one or more bodily joints of the first subject) may be determined using the spatial coordinates corresponding to the position of one or more bodily joints of the first subject. In some implementations, the method may further include generating a covariance of the determined spatial coordinates, executing at least one of: one or more machine learning processes and/or and one or more deep learning processes using the generated covariance, and determining whether a weakness is present/absent in one or more bodily joints of the first subject based on the executed machine learning process(es) and/or deep learning process(es). Some non-limiting examples of such process(es) may include support vector machine(s) process(es).

In some implementations, training of the model may include comparing one or more spatial coordinates (e.g., coordinate x) corresponding to a position of at least one bodily joint (e.g., ankle) of the first subject to one or more spatial coordinates (e.g., coordinate z) corresponding to a position of at least another bodily joint (e.g., hip) of the first subject. A presence/absence of a weakness may be determined based on this comparing.

In some implementations, the method may further include generating one or more user interfaces (e.g., user interface 108) displaying one or more heat maps (e.g., heat map 310 as shown in FIG. 3*b*) identifying at least one of a presence and an absence of an abnormality (e.g., abnormal position, movement, expression, etc.) in one or more bodily joints of the first subject. A weakness in the bodily joints of the first subject may be determined based on at least one of the presence and the absence of the identified abnormality.

In some implementations, the method may further include triggering a generation of one or more alerts based on the determination whether a weakness is present in one or more bodily joints of the first subject, and generating one or more user interfaces for displaying the alerts.

In some implementations, the method may further include determining that the first subject is experiencing at least one neurological event based on a determination that a weakness is present in one or more bodily joints of the first subject. The neurological event may include at least one of the following: an acute stroke, an ischemic stroke, a hemorrhagic stroke, a transient ischemic attack, a warning stroke, a mini-stroke, and any combination thereof.

In some implementations, at least one of the receiving, the extracting, the training, and the applying may be performed in substantially real time.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT), a liquid crystal display (LCD) monitor, a head-mounted display (HMD), a holographic display, etc. for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:

receiving, using at least one processor, one or more video recordings of one or more subjects;

extracting, using the at least one processor, one or more features from each of the one or more video recordings, the one or more features corresponding to one or more bodily joints of the one or more subjects;

training, using the at least one processor, one or more models based on the extracted features to identify a weakness in the one or more bodily joints; and applying, using the at least one processor, the trained model to a first video recording in the one or more video recordings of a first subject in the one or more subjects, and determining, using the applied model, whether a weakness is present in one or more bodily joints of the first subject wherein the applying includes determining one or more spatial coordinates corresponding to a position of one or more bodily joints of the first subject;

generating, using the at least one processor, a covariance of the determined one or more spatial coordinates;

executing, using the at least one processor, one or more machine learning processes and/or one or more deep learning processes, using the generated covariance; and determining, using the at least one processor, whether a weakness is present in one or more bodily joints of the first subject based on the executed one or more machine learning processes and/or the executed one or more deep learning processes.

2. The method according to claim 1, wherein the extracted one or more features correspond to one or more spatial coordinates of the one or more bodily joints.

3. The method according to claim 1, wherein the one or more features are extracted from a predetermined portion of the first video recording of the first subject.

4. The method according to claim 1, wherein the first video recording of the first subject is obtained while the first subject is positioned at rest.

5. The method according to claim 1, wherein a presence of a weakness is determined using the one or more spatial coordinates corresponding to the position of one or more bodily joints of the first subject.

6. The method according to claim 1, wherein the training includes comparing one or more spatial coordinates corresponding to a position of at least one bodily joint of the first subject to one or more spatial coordinates corresponding to a position of at least another bodily joint of the first subject.

7. The method according to claim 6, wherein a presence of a weakness is determined based on the comparing.

8. The method according to claim 1, further comprising generating one or more user interfaces displaying one or more heat maps identifying at least one of a presence and an absence of an abnormality in one or more bodily joints of the first subject.

9. The method according to claim 8, wherein a weakness in the one or more bodily joints of the first subject is determined based on at least one of the presence and the absence of the abnormality.

10. The method according to claim 1 further comprising triggering, using the at least one processor, a generation of one or more alerts based on the determining whether a weakness is present in one or more bodily joints of the first subject; and generating, using the at least one processor, one or more user interfaces for displaying the one or more alerts.

11. The method according to claim 1, further comprising determining the first subject is experiencing at least one neurological event based on a determination that a weakness is present in one or more bodily joints of the first subject.

12. The method according to claim 11, wherein the at least one neurological event includes an acute stroke, an ischemic stroke, a hemorrhagic stroke, a transient ischemic attack, a warning stroke, a mini-stroke, and/or any combination thereof.

13. The method according to claim 1, wherein at least one of the receiving, the extracting, the training, and the applying is performed in substantially real time.

14. A system comprising:

at least one programmable processor; and a non-transitory machine-readable medium storing instructions that, when executed by the at least one programmable processor, cause the at least one programmable processor to perform operations comprising:

receiving, using at least one processor, one or more video recordings of one or more subjects;

extracting, using the at least one processor, one or more features from each of the one or more video recordings, the one or more features corresponding to one or more bodily joints of the one or more subjects;

training, using the at least one processor, one or more models based on the extracted features to identify a weakness in the one or more bodily joints; and applying, using the at least one processor, the trained model to a first video recording in the one or more video recordings of a first subject in the one or more subjects, and determining, using the applied model, whether a weakness is present in one or more bodily joints of the first subject, wherein the applying includes determining one or more spatial coordinates corresponding to a position of one or more bodily joints of the first subject;

generating, using the at least one processor, a covariance of the determined one or more spatial coordinates;

executing, using the at least one processor, one or more machine learning processes and/or one or more deep learning processes, using the generated covariance; and determining, using the at least one processor, whether a weakness is present in one or more bodily joints of the first subject based on the executed one or more machine learning processes and/or the executed one or more deep learning processes.

15. The system according to claim 14, wherein the extracted one or more features correspond to one or more spatial coordinates of the one or more bodily joints.

16. The system according to claim 14, wherein the one or more features are extracted from a predetermined portion of the first video recording of the first subject.

17. The system according to claim 14, wherein the first video recording of the first subject is obtained while the first subject is positioned at rest.

18. The system according to claim 14, wherein the applying includes determining one or more spatial coordinates corresponding to a position of one or more bodily joints of the first subject.

19. A computer program product comprising a non-transitory machine-readable medium storing instructions that, when executed by at least one programmable processor, cause the at least one programmable processor to perform operations comprising:

receiving, using at least one processor, one or more video recordings of one or more subjects;

extracting, using the at least one processor, one or more features from each of the one or more video recordings, the one or more features corresponding to one or more bodily joints of the one or more subjects;

training, using the at least one processor, one or more models based on the extracted features to identify a weakness in the one or more bodily joints; and applying, using the at least one processor, the trained model to a first video recording in the one or more video recordings of a first subject in the one or more subjects, and determining, using the applied model, whether a weakness is present in one or more bodily joints of the first subject, wherein the applying includes determining one or more spatial coordinates corresponding to a position of one or more bodily joints of the first subject;

generating, using the at least one processor, a covariance of the determined one or more spatial coordinates;

executing, using the at least one processor, one or more machine learning processes and/or one or more deep learning processes, using the generated covariance; and determining, using the at least one processor, whether a weakness is present in one or more bodily joints of the first subject based on the executed one or more machine learning processes and/or the executed one or more deep learning processes.

* * * * *